(12) United States Patent
Peng

(10) Patent No.: US 10,584,755 B2
(45) Date of Patent: Mar. 10, 2020

(54) STROLLER

(71) Applicant: APRICA CHILDREN'S PRODUCTS G.K., Osaka (JP)

(72) Inventor: Tseshan Peng, Taipei (TW)

(73) Assignee: APRICA CHILDREN'S PRODUCTS G.K., Osaka (JP)

( * ) Notice: Subject to any disclaimer, the term of this patent is extended or adjusted under 35 U.S.C. 154(b) by 0 days.

(21) Appl. No.: 15/886,538

(22) Filed: Feb. 1, 2018

(65) Prior Publication Data
US 2018/0245649 A1    Aug. 30, 2018

(30) Foreign Application Priority Data

Feb. 28, 2017  (JP) ................................ 2017-035839

(51) Int. Cl.
| | | |
|---|---|---|
| *B62B 9/08* | (2006.01) | |
| *F16D 65/28* | (2006.01) | |
| *F16D 63/00* | (2006.01) | |
| *F16D 127/06* | (2012.01) | |
| *F16D 121/16* | (2012.01) | |
| *F16D 127/04* | (2012.01) | |

(52) U.S. Cl.
CPC ............. *F16D 65/28* (2013.01); *B62B 9/085* (2013.01); *B62B 9/087* (2013.01); *F16D 63/006* (2013.01); *F16D 2121/16* (2013.01); *F16D 2127/04* (2013.01); *F16D 2127/06* (2013.01)

(58) Field of Classification Search
CPC .... F16D 65/28; F16D 63/006; F16D 2127/04; F16D 2121/16; F16D 2127/06; B62B 9/087; B62B 9/085
See application file for complete search history.

(56) References Cited

U.S. PATENT DOCUMENTS

| 1,416,427 A | * | 5/1922 | Volkman | ............... B62B 5/0438 |
| | | | | 188/22 |
| 1,450,409 A | * | 4/1923 | Cirac | .................. B24D 15/105 |
| | | | | 188/30 |

(Continued)

FOREIGN PATENT DOCUMENTS

| JP | 2005306143 A | * | 11/2005 | |
| JP | 2005306143 A | | 11/2005 | |
| JP | 2015160451 A | | 9/2015 | |

*Primary Examiner* — Jacob B Meyer

(74) *Attorney, Agent, or Firm* — Eversheds Sutherland (US) LLP

(57) ABSTRACT

A stroller capable of making braking easy and maintaining itself in a brake release state with a simple structure is provided. The stroller includes a body frame, wheels, a brake member located at a lower end of a leg section, and displaced between a braking position and a brake release position, an operating mechanism attached to the push rod, operatively associated with the brake member through a coupling member coupling the operating mechanism and the brake member, and being capable of being displaced between a first position corresponding to the braking position of the brake member and a second position corresponding to the brake release position of the brake member, a bias member biasing the brake member to move the brake member to the braking position, and a maintaining mechanism maintaining the operating mechanism in the second position corresponding to the brake release position.

9 Claims, 9 Drawing Sheets

(56) References Cited

U.S. PATENT DOCUMENTS

| | | | | |
|---|---|---|---|---|
| 1,784,976 A * | 12/1930 | Schnabel | | B62B 9/08 188/20 |
| 1,810,428 A * | 6/1931 | Lazzeri | | B62B 9/08 188/167 |
| 1,861,958 A * | 6/1932 | Gallinant | | B62B 5/0438 188/20 |
| 4,084,663 A * | 4/1978 | Haley | | B62B 5/04 188/19 |
| 4,116,464 A * | 9/1978 | Haley | | B62B 5/04 280/33.994 |
| 4,618,033 A * | 10/1986 | Kassai | | B62B 9/087 188/20 |
| 5,370,408 A * | 12/1994 | Eagan | | B62B 9/085 188/20 |
| 5,390,943 A * | 2/1995 | Hedrick | | B60T 11/046 188/22 |
| 5,713,585 A * | 2/1998 | Curtis | | B62B 9/085 188/20 |
| 6,022,042 A * | 2/2000 | Hartenstine | | B62B 9/082 188/20 |
| 6,148,942 A * | 11/2000 | Mackert, Sr. | | B62B 9/00 180/65.6 |
| 6,298,949 B1 * | 10/2001 | Yang | | B62B 5/0414 188/19 |
| 6,561,537 B1 * | 5/2003 | Chen | | A63B 69/0028 188/20 |
| 6,817,451 B1 * | 11/2004 | Chen | | B62B 5/0438 188/19 |
| 7,448,476 B2 * | 11/2008 | Otterson | | B62B 5/04 188/19 |
| 8,146,928 B2 * | 4/2012 | Geeslin | | B62B 9/085 280/47.38 |
| 8,333,393 B2 * | 12/2012 | Geeslin | | B62B 9/085 280/47.38 |
| 8,991,838 B2 * | 3/2015 | Li | | B62B 9/20 280/47.38 |
| 8,997,948 B2 * | 4/2015 | Li | | B62B 9/082 188/156 |
| 9,108,658 B2 * | 8/2015 | Spencer | | B62B 9/085 |
| 10,279,832 B2 * | 5/2019 | Fleming | | B60T 11/046 |
| 2003/0094792 A1 * | 5/2003 | Chen | | A63B 69/0028 280/648 |
| 2004/0100056 A1 * | 5/2004 | Tuan | | A63C 17/01 280/87.042 |
| 2007/0045055 A1 * | 3/2007 | Lan | | B62B 9/08 188/20 |
| 2007/0090617 A1 * | 4/2007 | Lin | | B62B 1/18 280/47.31 |
| 2008/0185236 A1 * | 8/2008 | Chen | | B62B 7/083 188/20 |
| 2009/0120736 A1 * | 5/2009 | Masterson | | B62B 5/04 188/19 |
| 2009/0289431 A1 * | 11/2009 | Geeslin | | B62B 9/085 280/47.38 |
| 2012/0133105 A1 * | 5/2012 | Geeslin | | B62B 9/085 280/47.35 |
| 2013/0192410 A1 * | 8/2013 | Hoffmann | | B62B 5/0414 74/526 |
| 2013/0213749 A1 * | 8/2013 | Li | | B62B 9/082 188/156 |
| 2014/0196991 A1 * | 7/2014 | Fite | | B62B 9/085 188/69 |
| 2014/0345980 A1 * | 11/2014 | Shellenberger | | B62B 9/087 188/20 |
| 2014/0346746 A1 * | 11/2014 | Li | | B62B 9/085 280/47.38 |
| 2015/0137467 A1 * | 5/2015 | Spencer | | B62B 9/085 280/47.38 |
| 2018/0229751 A1 * | 8/2018 | Yabuuchi | | B62B 5/0433 |
| 2018/0245649 A1 * | 8/2018 | Peng | | F16D 63/006 |

\* cited by examiner

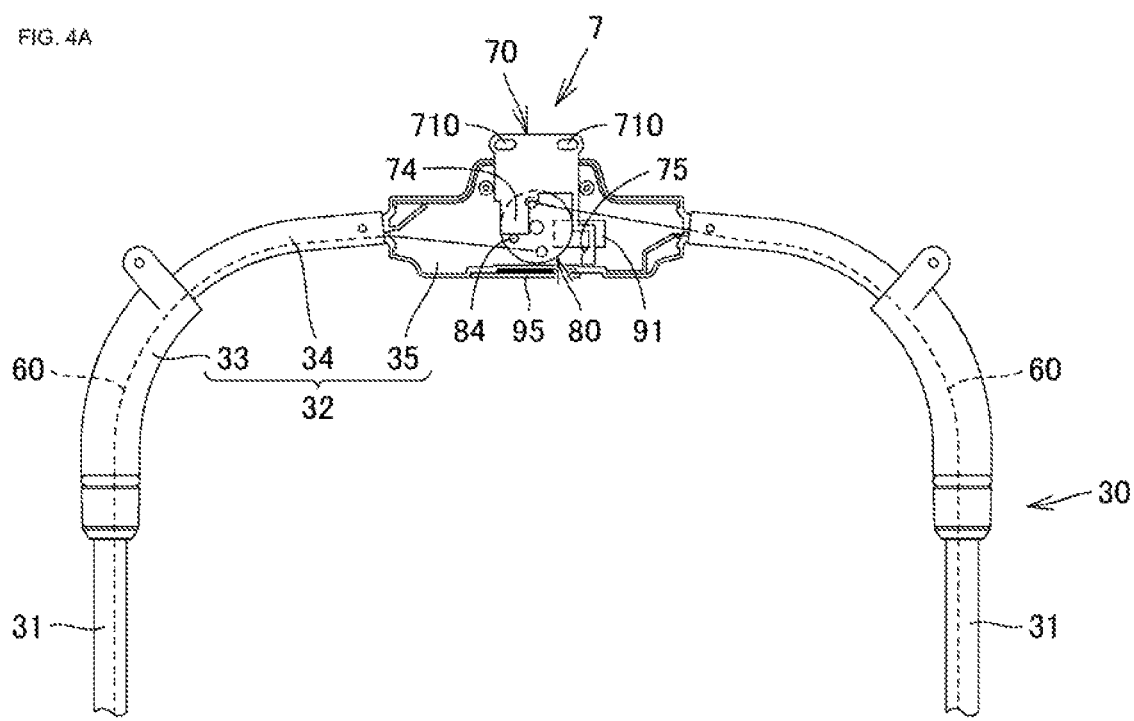
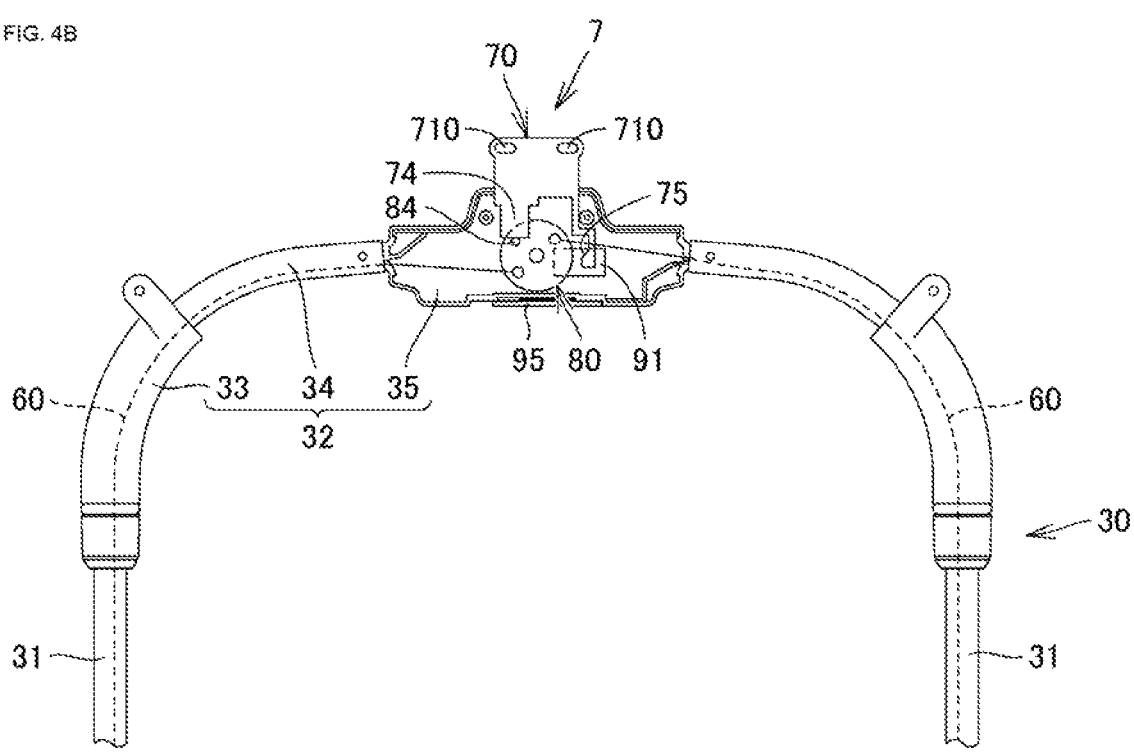

STROLLER

CROSS-REFERENCE TO RELATED APPLICATIONS

This application claims priority to Japanese Patent Application No. 2017-035839 filed Feb. 28, 2017, the entire contents of which are hereby incorporated herein by reference for all purposes.

BACKGROUND OF THE DEVICE

Field of the Device

This invention relates to a stroller, and more particularly to a stroller having a brake member.

Description of the Related Art

Examples of pushcarts are disclosed in Japanese Unexamined Patent Application Publication Nos. 2005-306143 ("PTL 1") and 2015-160451 ("PTL 2").

PTL 1 discloses brake operation using contact resistance. In this disclosure, a brake lever is manipulated to rotate in a braking direction to pull up a brake member mounted on a wheel, and then the pulled-up brake member presses a brake pad against the inner circumferential surface of the wheel to generate contact resistance.

PTL 2 discloses a pushcart that is automatically permitted to move when an operator touches a grip of the pushcart with his/her hand, and is automatically braked to stop the rotation of the wheels when the operator takes his/her hand off the grip.

SUMMARY OF THE DEVICE

The pushcart of PTL 1 uses contact resistance between the brake pad and the inner circumferential surface of the wheel to apply a brake, and therefore the operator needs to keep pressing the brake lever with a sufficiently strong force to maintain the brake.

On the other hand, the pushcart of PTL 2 is configured to apply a brake upon release of the grip, and therefore the operator needs to keep holding the grip constantly to maintain the pushcart in the moving state.

The present invention has been made to solve the aforementioned problems and has an object to provide a stroller that makes braking easy and maintains itself in a brake release state with a simple structure.

A stroller in an aspect of the present invention includes: a body frame that including a leg section and a push rod; wheels each provided at a lower end of the leg section; a brake member located at a lower end of the leg section, and displaced between a braking position in which the brake member is engaged with the wheel to stop the wheel from rotating and a brake release position in which the brake member is disengaged from the wheel to permit the wheel to rotate; an operating mechanism attached to the push rod, operatively associated with the brake member through a coupling member coupling the operating mechanism and the brake member, and being capable of being displaced between a first position corresponding to the braking position of the brake member and a second position corresponding to the brake release position of the brake member; a bias member biasing the brake member to move the brake member to the braking position; and a maintaining mechanism maintaining the operating mechanism in the second position corresponding to the brake release position.

Preferably, the operating mechanism includes an operation member, and a displacement member that abuts against the operation member and is displaced between the first position and the second position in conjunction with operation of the operation member. The displacement member is coupled to the coupling member, and is biased to move toward the first position.

Preferably, the maintaining mechanism includes a first stopper capable of moving between an engagement position in which the first stopper is engaged with the operation member to maintain the operation member in the second position and a disengagement position in which the first stopper is disengaged from the operation member.

Preferably, the maintaining mechanism includes a second stopper capable of moving between an engagement position in which the second stopper is engaged with the displacement member to maintain the displacement member in the second position and a disengagement position in which the second stopper is disengaged from the displacement.

Preferably, the second stopper includes a bias member biasing the second stopper to abut the second stopper against the displacement member. The displacement member includes a disengagement portion that receives the second stopper at the second position.

Preferably, the operation member includes an abutment/linkage portion that abuts on the second stopper to disengage the second stopper from the disengagement portion when the operation member moves from the second position to the first position.

Preferably, the second stopper moves a distance to abut on the abutment/linkage portion on its way from the second position to the first position.

Preferably, the stroller further includes a movement delay mechanism that maintains the engagement position in which the second stopper is engaged with the displacement member, in a first stroke region in which the operation member moves from the second position to the first position, and brings the second stopper into the disengagement position, in which the second stopper is disengaged from the displacement member, in a second stroke region in which the operation member moves from the first stroke region to the first position.

Preferably, the operating mechanism further includes a lever handle that extends in a width direction along the push rod, and is attached to the push rod at opposite ends, and the operation member is displaced in conjunction with operation of the lever handle.

The present invention having the above-described configuration can provide a stroller capable of making braking easy and maintaining itself in a brake release state with a simple structure.

The operation and effect of the preferred embodiments will be described under the following categories by referring to the drawings.

BRIEF DESCRIPTION OF THE DRAWINGS

FIG. 3A shows it in a ready-to-move state, while FIG. 3B shows it in a braking state;

FIGS. 4A and 4B are front views of the push rod of the stroller according to the first embodiment, and FIG. 4A shows it in a ready-to-move state, while FIG. 4B shows it in a braking state;

DESCRIPTION OF THE PREFERRED EMBODIMENTS

Figure 1:
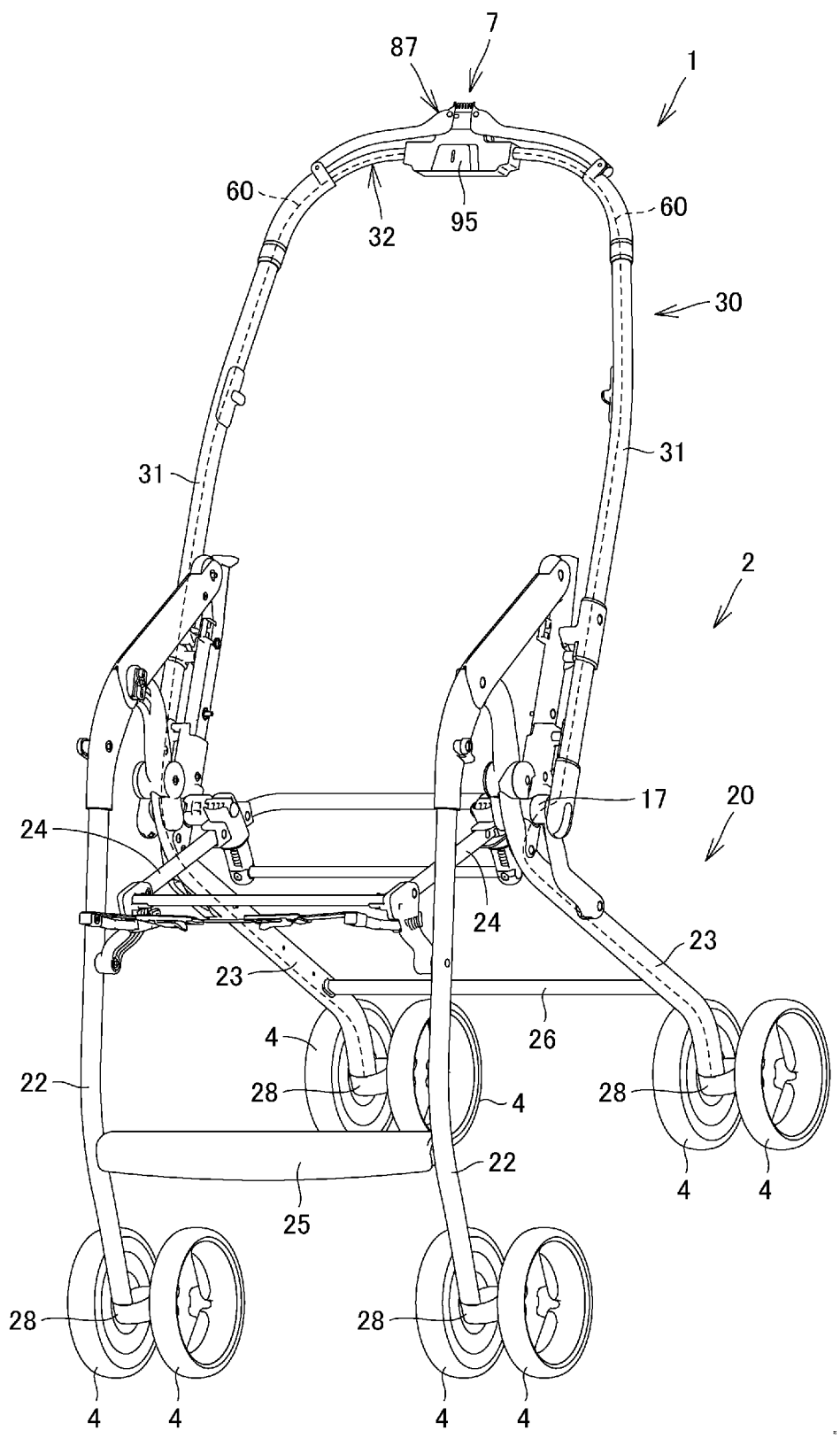
FIG. 1 is a perspective view of a stroller according to the first embodiment.

With reference to the drawings, embodiments of the present invention will be described in detail. The same or similar components are denoted by the same reference symbols or reference numerals throughout the drawings, and the description thereof will not be reiterated.

About Outline of Stroller—First of all, with reference to FIGS. 1 and 2, a stroller 1 according to embodiments will be described. The stroller 1 is, for example, a so-called reversible stroller that has a seat switchable between a rear-facing mode and a forward-facing mode. The stroller 1 shown in FIG. 1 is in the forward-facing mode.

The stroller 1 includes a body frame 2, and wheels 4 provided at lower ends of the body frame 2.

The body frame 2 includes a leg section 20 and a push rod 30. The leg section 20 includes a pair of front legs 22, a pair of rear legs 23, a pair of seat supporting members 24, a cross member 25 coupling the front legs 22, and a cross member 26 coupling the rear legs 23. The front legs 22 are disposed apart from each other in the width direction. The rear legs 23 are also disposed apart from each other in the width direction. By the way, the "width direction" is synonymous with a transverse direction that is perpendicular to the moving direction of the stroller 1.

The push rod 30 includes a pair of vertical rods 31 extending vertically, and a handle 32 coupling upper ends of the vertical rods 31. The push rod 30 is attached to the leg section 20 with a pivot 17 and can pivotally move forward and backward about the pivot 17. On the handle 32 attached is an operating mechanism 7, which will be described later. Operating (pressing) the operating mechanism 7 can bring the stroller 1 into a ready-to-move state, while taking the hand off the operating mechanism 7 can bring the stroller 1 into a stopped state. Description about the operating mechanism 7 will be given later.

The wheels 4 are four dual-wheels provided at lower ends of the leg section 20, and two of which are front wheels and the other two are rear wheels. The dual-wheels are aligned in the width direction at forward and rearward positions along the moving direction of the stroller 1 in a forward-facing mode. As shown in FIG. 2, a wheel 4 is rotatably held with an axle 41. The axle 41 is supported by a bearing 29 of a holder 28 attached to a lower end of a rear leg 23. A plurality of radially-extending ribs 42 are provided around the axle 41 of the wheel 4. On the holder 28, for example, a brake member 5 is mounted to stop the wheel 4 from rotating. The dual-wheel may be a caster.

The brake member 5 is displaced between a braking position and a brake release position. In the braking position, the brake member 5 is engaged with a rib 42 of the wheel 4 to stop the wheel 4 from rotating, and in the brake release position, the brake member 5 is disengaged from the rib 42 of the wheel 4 to permit the wheel 4 to rotate. The brake member 5 is biased by a bias member (not shown) so as to move to the braking position. The bias member is, for example, a spring, and may be attached in the vicinity of the wheel 4, but also can be provided anywhere, for example, in the handle 32.

Figure 2:
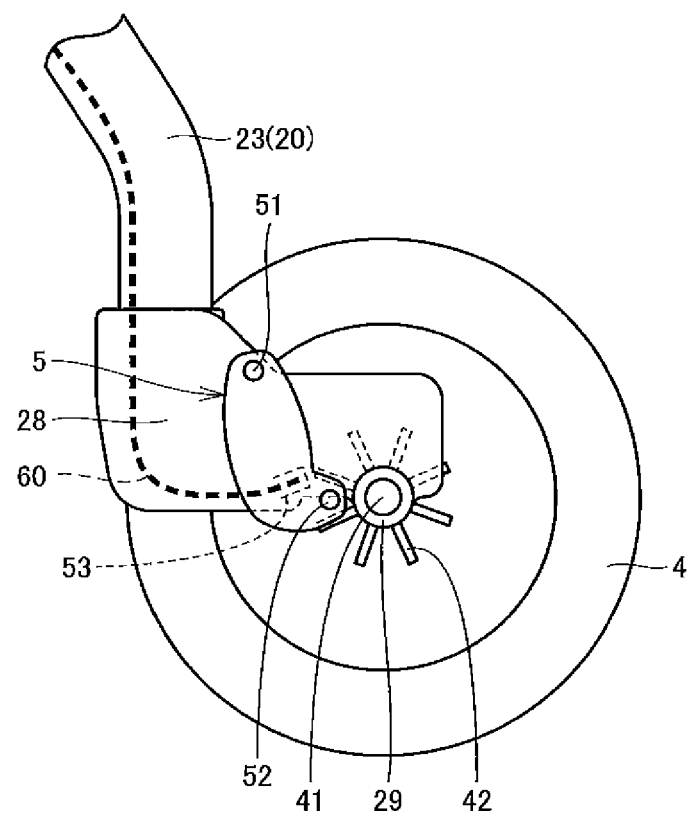
FIG. 2 is a diagram of a wheel and a brake member of the stroller according to the first embodiment.

FIG. 2 shows the brake member 5 displaced in the braking position. The brake member 5 has an engagement portion 52 to be engaged with the rib 42, and is rotatable about a pin 51 with respect to the holder 28. In the vicinity of the engagement portion 52 of the brake member 5, a recessed portion 53 is provided to hold a wire 60 serving as a coupling member.

The wire 60 extends from the brake member 5 to the operating mechanism 7 mounted on the handle 32 through inside the rear leg 23 and vertical rod 31. Thus, the brake member 5 and the operating mechanism 7 are coupled to each other with the wire 60, and therefore, the brake member 5 can be displaced between the braking position and brake release position by operating the operating mechanism 7.

As described above, the stroller 1 of this embodiment enters a ready-to-move state when the user operates (presses) the operating mechanism 7 mounted on the handle 32, while entering a stopped state when the user takes his/her hand off the operating mechanism 7. Strollers having such a configuration generally require the user to keep gripping the handle firmly to stay in the ready-to-move state. However, the stroller 1 according to this embodiment does not require the user to keep gripping the handle, and can stay in the ready-to-move state even if the user's gripping force becomes somewhat weaker. The following will describe this stroller 1 in detail.

About First Embodiment—Referring to FIGS. 3 to 5, the handle 32 of the stroller 1 will be described. In order to provide a clear understanding, in FIG. 4, a front cover 36 of a container 35 mounted at the center of the handle 32, and a lever handle 87 making up the operating mechanism 7 are removed. Note that the direction indicated by an arrow A1 is referred to as an up-down direction, and the left-right direction indicated by an arrow A2 is referred to as a width direction in FIG. 5.

The handle 32 is roughly U-shaped as a whole, and includes a pair of handle frames 33 extending upwardly from the vertical rods 31, a pair of lateral rods 34 extending in the width direction from the handle frames 33, and a container 35 provided between the lateral rods 34. The container 35 has an empty space inside, and houses in the space the operating mechanism 7 that operates the brake members 5 to stop or permit the rotation of the wheels 4. As shown in FIG. 3, a front cover 36 is attached to cover the front surface of the container 35.

Figure 3A:
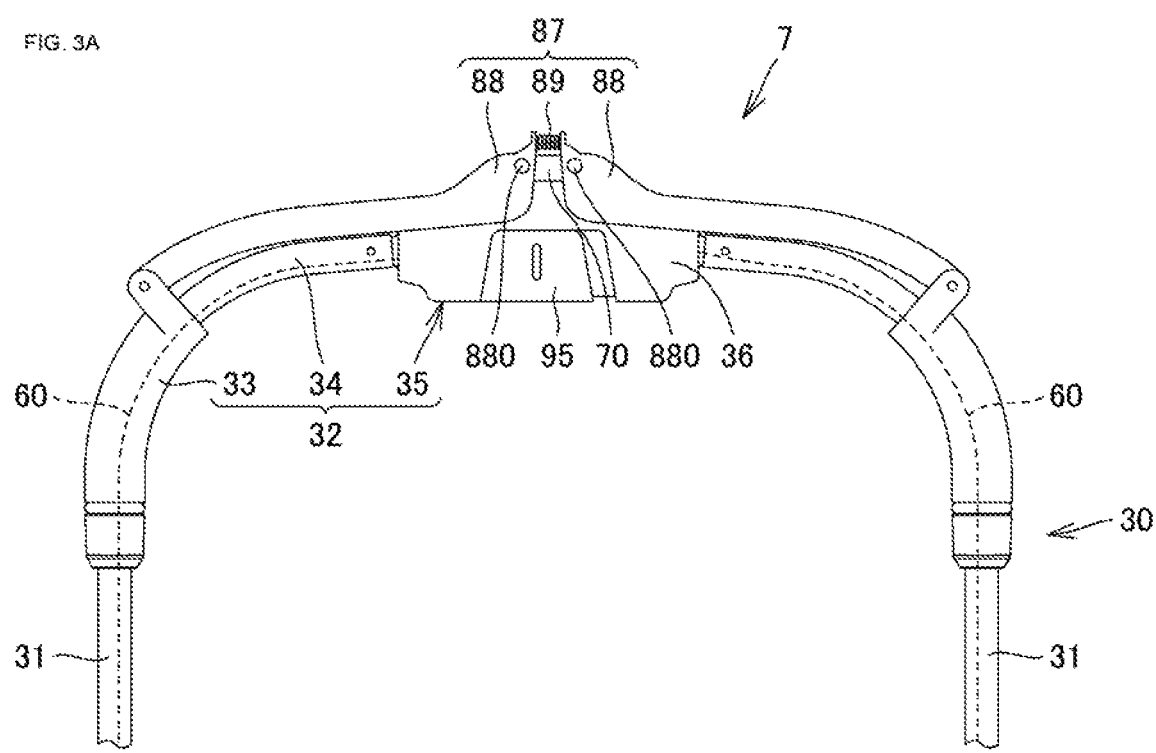
FIGS. 3A and 3B are front views of a push rod of the stroller according to the first embodiment.

Referring to FIG. 4, a part of the operating mechanism 7 in this embodiment is disposed in the container 35 of the handle 32. The operating mechanism 7 that is coupled to the brake member 5 with the wire 60 is operatively associated with the brake member 5, and can be displaced between a first position corresponding to the braking position of the brake member 5 (FIGS. 3B and 4B) and a second position corresponding to the brake release position of the brake member 5 (FIGS. 3A and 4A). More specifically, while the user's hand is off the stroller 1, the operating mechanism 7 is in the first position and the brake member 5 remains displaced in the braking position, but pressing down the operating mechanism 7 to the second position can displace the brake member 5 to the brake release position.

The operating mechanism 7 includes an operation member 70, and a displacement member 80 that abuts against the operation member 70 and is displaced between the first position and second position in conjunction with operation of the operation member 70. FIG. 5 shows the operating mechanism 7 in FIG. 4, and a maintaining mechanism, which will be described later, in schematic form.

Figure 5:
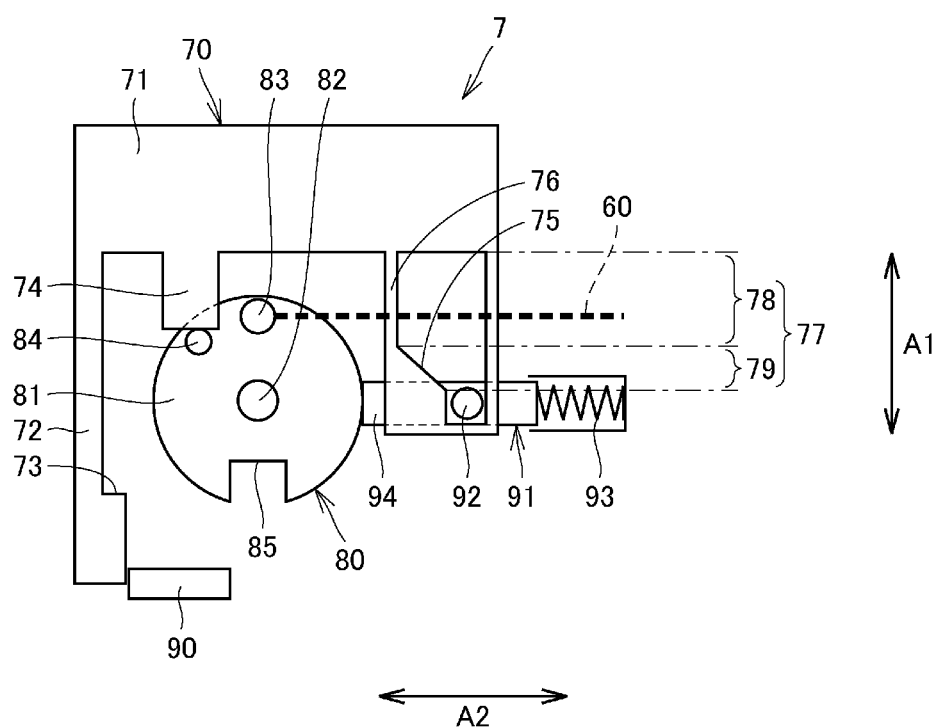
FIG. 5 is a diagram of an operating mechanism and a maintaining mechanism in the first embodiment, these mechanisms being attached to the push rod that is not shown in FIG. 5.

Referring particularly to FIG. 5, the operation member 70 includes a main operation body 71, a locking portion 72 that locks a first stopper 90, which will be described later, a movement transmission portion 74 that transmits the movement of the operation member 70 to the displacement member 80, and a movement delay mechanism 77 that delays transmitting the movement of the operation member 70 to the displacement member 80. Under the locking portion 72 formed is a jut 73 used to lock the first stopper 90. The movement transmission portion 74 extends downward from the main operation body 71 and abuts on the projection 84 of the undermentioned displacement member 80.

The movement delay mechanism 77 includes an elongated portion 76 extending downward from the main operation body 71, and an abutment/linkage portion 75 that is contiguous to the elongated portion 76 and extends obliquely in a direction away from the displacement member 80. There is a distance from the main operation body 71 to the abutment/linkage portion 75 along the elongated portion 76. In this embodiment, the abutment/linkage portion 75 is formed in an enclosing portion that extends downward from the main operation body 71 and encloses an engagement portion 92 of a second stopper 91, which will be described later. The relationship of the movement delay mechanism 77, displacement member 80, and second stopper 91 will be described later.

The displacement member 80 is coupled to a wire 60 and is biased so as to move to the first position shown in FIG. 4B. Referring particularly to FIG. 5, the displacement member 80 in this embodiment includes a disk-shaped main displacement body 81, and a center portion 82 securing the main displacement body 81 to the container 35. The displacement member 80 rotates about the center portion 82. The displacement member 80 includes a disengagement portion 85 that receives the second stopper 91. The disengagement portion 85 is a recess formed in the outer circumferential surface of the main displacement body 81.

The wire 60 is connected to a decentered position of the displacement member 80, in other words, to a connecting portion 83 located off the center portion 82. It should be noted that the wire 60 in this embodiment is split into two in the container 35 on the handle 32, but the schematic diagram of FIG. 5 shows only one of the wires 60 for ease of illustration and clarity. The wire 60 can be stretched or loosened by rotating the displacement member 80 about the center portion 82. The displacement member 80 is provided with a projection 84 at a position decentered from the center portion 82; in other words, at a position deviated from the center portion 82. The projection 84 is roughly cylindrical, and always abuts against the aforementioned movement transmission portion 74 of the operation member 70.

Figure 3B:
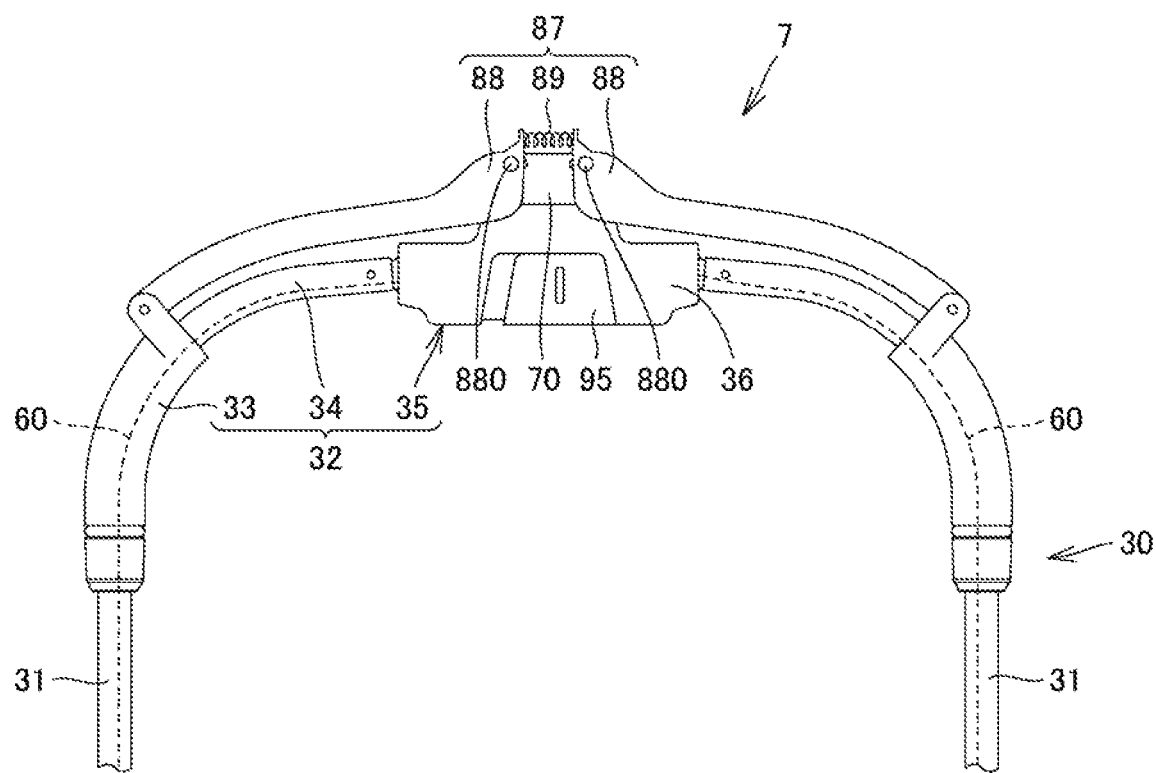

As shown in FIGS. 3A and 3B, in this embodiment, the operating mechanism 7 further includes a lever handle 87 that extends along the handle 32 of the push rod 30 in the width direction, and has opposite ends both attached to the handle frame portions 33 respectively. Specifically, the lever handle 87 is provided above the lateral rods 34 and container 35. The lever handle 87 includes a pair of levers 88 extending in the width direction, and a spring 89 provided between the levers 88. The lever 88 may be made of, for example, a plastic so as to bend when an operator grips the lever with one hand. The lever 88 covers an upper part of the operation member 70, and abuts against the operation member 70. The spring 89 biases the levers 88 outwardly in the width direction.

Referring to FIGS. 3A, 3B, 4A, 4B, a pair of horizontally-long holes 710 are formed in an upper area of the operation member 70, and pins 880 that pass through the levers 88 also pass through the horizontally-long holes 710. When the levers 88 that are pressed from above compress the spring 89 as shown in FIG. 3A, the levers 88 are permitted to move inwardly in the width direction because the pins 880 holding the levers 88 can move inwardly within the horizontally-long holes 710.

The levers 88 abut on an upper part of the operation member 70, and thereby the operation member 70 moves in conjunction with the lever handle 87. As shown in FIG. 3A, if an operator presses the lever handle 87 from above, the levers 88 move closer to each other and are also displaced downwardly. Then, the downward movement of the levers 88 moves down the operation member 70, and the movement transmission portion 74 of the operation member 70 presses the projection 84 of the displacement member 80 to rotate the displacement member 80 counterclockwise. As shown in FIG. 3B, if the operator takes his/her hand off the lever handle 87, the levers 88 move away from each other and are also displaced upwardly. The upward movement of the levers 88 moves up the operation member 70, and the displacement member 80 rotates clockwise with the upward movement of the movement transmission portion 74.

Next, description will be made about the first stopper 90 and second stopper 91 that maintain the operating mechanism 7 in a second position corresponding to the brake release position.

Figure 7:
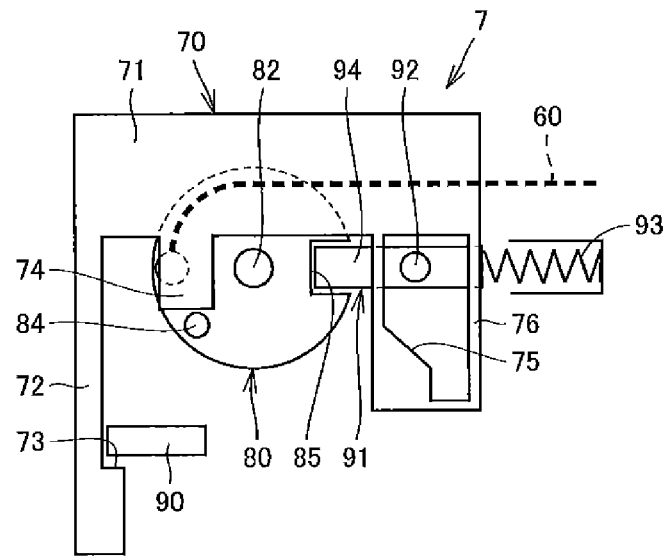
FIG. 7 schematically shows an operating member with which a first stopper is engaged in the first embodiment.

Referring to FIGS. 5 and 7, the first stopper 90 is movable between an engagement position where the first stopper 90 is engaged with the jut 73 of the operation member 70 to maintain the operation member 70 in the second position (FIG. 7) and a disengagement position where the first stopper 90 is disengaged from the operation member 70 (FIG. 5). The first stopper 90 is attached to the front cover 36, and is operated by a switch 95 provided on the front cover 36. As shown in FIG. 3A, when the switch 95 is located on the left side on the drawing, the operation member 70 is maintained in the second position corresponding to the brake release position.

The second stopper 91 can move between an engagement position where the second stopper 91 is engaged with the displacement member 80 to maintain the displacement member 80 in the first position (FIGS. 6(b) and 6(c)) and a disengagement position where the second stopper 91 is disengaged from the displacement member 80 (FIG. 6(a)). In this embodiment, the second stopper 91 includes a main second-stopper body 94 that engages with the aforementioned disengagement portion 85, a bias member 93 that biases the main second-stopper body 94 to make the main second-stopper body 94 abut against the displacement member 80, and an engagement portion 92 positioned inside the aforementioned enclosing portion of the operation member 70. The second stopper 91 is attached to the container 35, and is movable in the width direction. The bias member 93 is, for example, a spring.

The first stopper 90 and second stopper 91 are both used to maintain the operating mechanism 7 in the second position corresponding to the brake release position, and are collectively called a maintaining mechanism.

Figure 6:
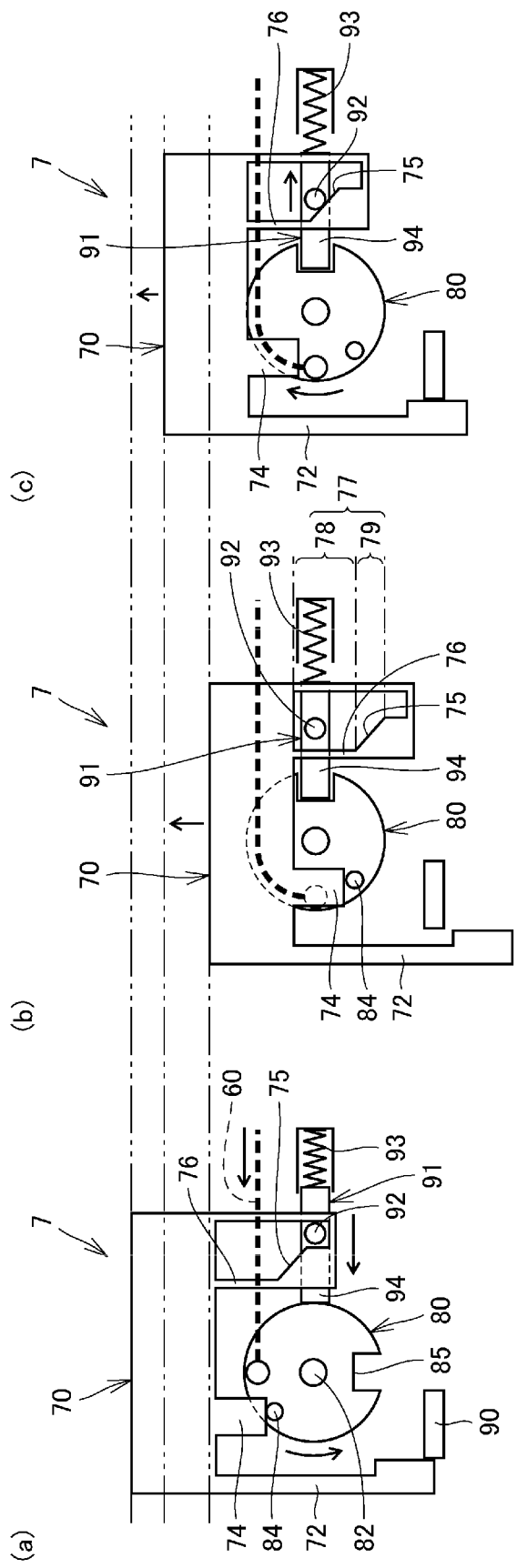
FIG. 6 schematically show the movement of the operating mechanism and a second stopper attached to the push rod in the first embodiment.

Referring to FIGS. 5 and 6, a relationship of the movement delay mechanism 77 of the operation member 70, the displacement member 80, and the second stopper 91 will be described. FIG. 6(a) shows the operating mechanism 7 that is not operated, FIG. 6(b) shows the operation member 70 that is operated (pressed), and FIG. 6(c) shows the operation member 70 that is slightly moved upwardly from the position shown in FIG. 6(b). In other words, the operating mechanism 7 in FIG. 6(a) has been displaced to the first position, while the operating mechanisms 7 in FIGS. 6(b) and 6(c) have been displaced to the second position.

The movement delay mechanism 77 of the operating mechanism 7 includes a first stroke region 78 and a second stroke region 79. The first stroke region 78 is a region where the engagement position between the second stopper 91 and displacement member 80 is maintained. In other words, even if the operation member 70 is moved from the position shown in FIG. 6(b) to the position shown in FIG. 6(c), the second stopper 91 remains engaged with the disengagement portion 85 of the displacement member 80 in the first stroke region 78. Specifically, the elongated portion 76 stretches out in the up-down direction so as to provide a distance that the engagement portion 92 of the second stopper 91 can move until abutting on the abutment/linkage portion 75 of the operation member 70. The distance allows the second stopper 91 and displacement member 80 to maintain their engagement even if the operator's gripping force becomes weaker and the operation member 70 more or less moves upwardly, thereby maintaining the brake member 5 in the brake release position.

More specifically, when the engagement portion 92 of the second stopper 91, which moves in the up-down direction along the elongated portion 76 of the operation member 70, is displaced from the position shown in FIG. 6(b) to the position shown in FIG. 6(c), the engagement portion 92 moves a distance to abut on the abutment/linkage portion 75 of the operation member 70. Therefore, the operation member 70 pressed with a weakened force may bring itself upwardly as shown in FIG. 6(c), but does not move the displacement member 80 together therewith since the disengagement portion 85 of the displacement member 80 remains engaged with the second stopper 91.

The second stroke region 79 is a region where the second stopper 91 is disengaged from the displacement member 80 and is brought into the disengagement position. In other words, when the operation member 70 is moved from the position shown in FIG. 6(c) to the position shown in FIG. 6(a), the second stopper 91 is pulled off from the disengagement portion 85 of the displacement member 80 in the second stroke region 79. Specifically, when the abutment/linkage portion 75 moves from the second position (FIG. 6(c)) to the first position (FIG. 6(a)), the abutment/linkage portion 75 abuts on the engagement portion 92 of the second stopper 91. The engagement portion 92 that abuts on the abutment/linkage portion 75, as shown in FIG. 6(c), moves along the oblique surface of the abutment/linkage portion 75, and as a result the second stopper 91 is pulled off the disengagement portion 85 of the displacement member 80.

Referring to FIG. 6, operation of the operating mechanism 7 and second stopper 91 will be described.

As shown in FIG. 6(a), when the operation member 70 is pressed downwardly from above, the movement transmission portion 74 of the operation member 70 presses the projection 84 of the displacement member 80 downwardly. This downward press rotates the displacement member 80 clockwise about the center portion 82 at about 45 degrees so that the disengagement portion 85 of the displacement member 80 receives the second stopper 91. The rotation of the displacement member 80 pulls the wire 60 to displace the brake member 5 to the brake release position as shown in FIG. 6(b).

For example, the lever handle 87 pressed with a weakened force brings the operation member 70 from the state shown in FIG. 6(b) to the state shown in FIG. 6(c), and moves up the operation member 70, thereby moving the engagement portion 92 of the second stopper 91 from an upper area to a lower area of the first stroke region 78. During this movement, the second stopper 91 remains engaged with the disengagement portion 85 of the displacement member 80, and the engagement position between the second stopper 91 and displacement member 80 remains maintained.

In addition, for example, if the force to press the lever handle 87 is further weakened or the lever handle 87 is released from a hand, the operation member 70 enters the state shown in FIG. 6(a) from the state shown in FIG. 6(c), and moves further upwardly, thereby moving the engagement portion 92 of the second stopper 91 further downwardly across the second stroke region 79. This causes the engagement portion 92 of the second stopper 91 to abut on the abutment/linkage portion 75 of the operation member 70, and the second stopper 91 is pulled off the disengagement portion 85.

As described above, even if the lever handle 87 that is pressed with a weakened force moves the operation member 70 somewhat upwardly, or displaces the operation member 70 from the state shown in FIG. 6(b) to the state shown in FIG. 6(c), the movement delay mechanism 77 can delay transmitting the upward movement of the operation member 70 to the displacement member 80. The delay prevents the second stopper 91 and displacement member 80 from disengaging from each other even if the operator's gripping force becomes somewhat weaker, and therefore the operation member 70 can be maintained in the second position, and the brake member 5 can be maintained in the brake release position. As a result, the operator does not need to always grip the lever handle 87 tightly, but can keep moving the stroller 1 with a certain gripping force or more. The stroller 1 therefore can mitigate the force of the operator to keep gripping the lever handle 87, thereby taking a load off the operator.

In a case of a conventional stroller that enters a ready-to-move state when the handle is gripped by a hand and enters a stopped state immediately after the handle is released from the hand, a weak force to grip the handle would cause the brake member, which regulates the rotation of the wheel, to fail to engage with a rib of the wheel, and allows the wheel to rotate while the brake member is in contact with the rib, thereby causing scraping noise of the brake member and rib, and also causing breakage of the brake member. However, in the case of the stroller 1 according to the embodiment, a single strong press of the lever handle 87 brings the stroller 1 into the state shown in FIG. 6(b), and can maintain the engagement position between the second stopper 91 and displacement member 80 even if the force to grip the lever handle 87 becomes somewhat weaker. Accordingly the brake member 5 can be maintained in the brake release state, thereby eliminating the possibilities of making the scraping noise of the brake member and rib and breaking the brake member.

Referring to FIGS. 5 and 7, operation of the operating mechanism 7 and first stopper 90 will be described.

As shown in FIG. 7, when the operation member 70 is pressed downwardly from above, the movement transmission portion 74 of the operation member 70 presses the projection 84 of the displacement member 80 downwardly. This downward press rotates the displacement member 80 clockwise about the center portion 82 at about 45 degrees so that the disengagement portion 85 of the displacement member 80 receives the second stopper 91. The rotation of the displacement member 80 pulls the wire 60 so as to displace the brake member 5 to the brake release position. While keeping this state, the switch 95 is slid to lock the first stopper 90 in the locking portion 72 of the operation member 70. It is therefore possible in this manner to maintain the operating mechanism 7 in the second position, and to maintain the brake member 5 in the brake release position. As described above, the first stopper 90 is effectively used to maintain the stroller 1 in the ready-to-move state constantly even when the lever handle 87 is released.

Figure 8:
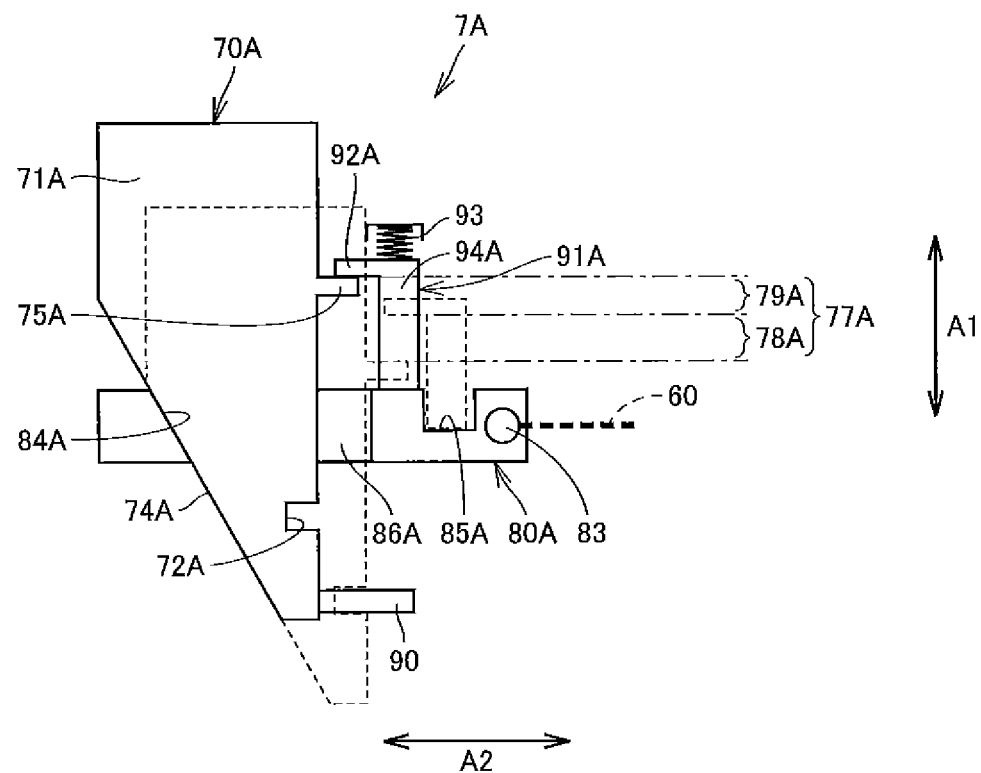
FIG. 8 is a diagram of an operating mechanism and a maintaining mechanism in the second embodiment, these mechanisms being attached to the push rod that is not shown in FIG. 8.
Figure 9:
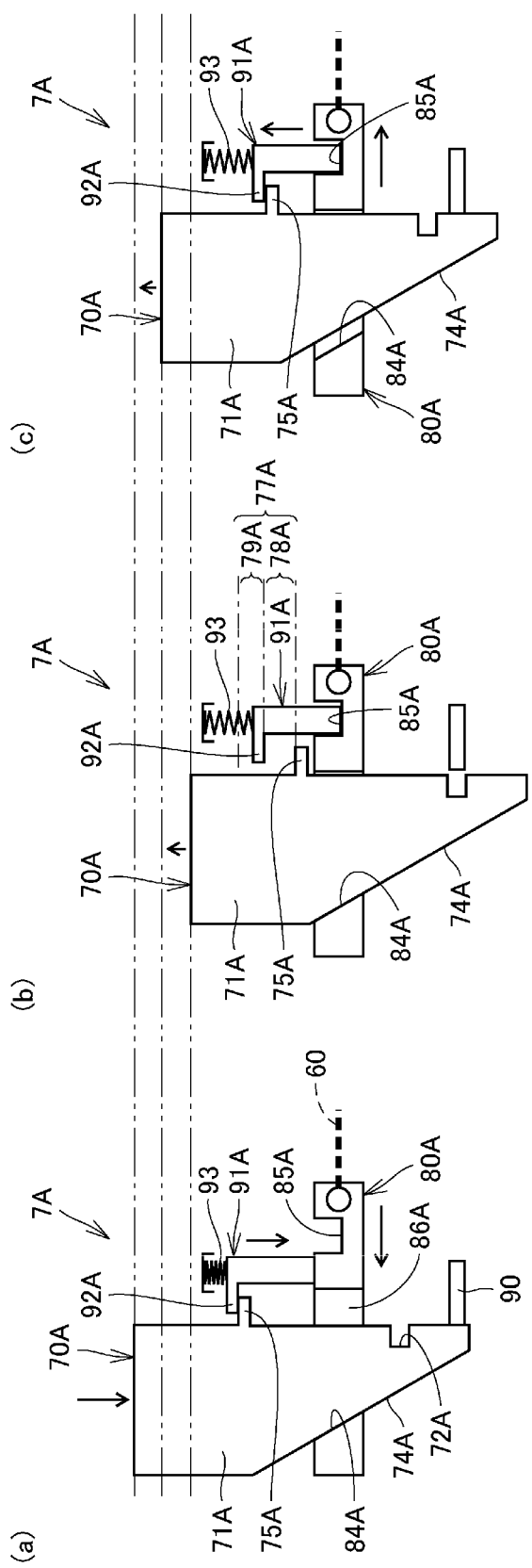
FIG. 9 schematically show the movement of the operating mechanism and a second stopper attached to the push rod in the first embodiment.
Figure 10:
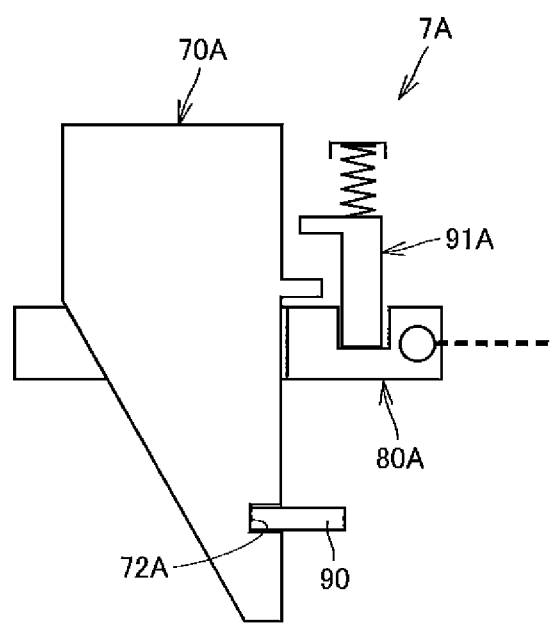
FIG. 10 schematically shows an operating member with which a first stopper is engaged in the first embodiment.

About Second Embodiment—FIGS. 8 to 10 show an operating mechanism 7A according to the second embodiment in schematic form. The displacement member 80 in the first embodiment is a rotating member rotating about the center portion 82; however, the displacement member 80A in the second embodiment is configured to slide in the width direction. In FIG. 8, the direction indicated by an arrow A1 denotes the up-down direction, and the left-right direction indicated by an arrow A2 denotes the width direction.

The operation member 70A includes a main operation body 71A extending in the up-down direction, a movement transmission portion 74A transmitting the movement of the operation member 70A to the displacement member 80A, and an abutment/linkage portion 75A projecting toward the second stopper 91A. In a lower part of the main operation body 71A formed is a lock portion 72 that is recessed to receive and lock a first stopper 90. The movement transmission portion 74A is an oblique portion tapering in the downward direction.

The displacement member 80A is roughly, for example, a flat plate having an opening 86A approximately at the center through which the main operation body 71A passes. The opening 86A has an inclined portion 84A that abuts on the movement transmission portion 74A of the main operation body 71A.

The second stopper 91A includes a main second-stopper body 94A extending in the up-down direction, and an engagement portion 92A located at the top of the main second-stopper body 94A and abutting against an upper part of the abutment/linkage portion 75A. A bias member 93 of the second stopper 91A is biased toward the displacement member 80A, that is, downwardly.

For the purpose of maintaining the engagement between the second stopper 91A and the disengagement portion 85A of the displacement member 80A when the operation member 70A moves from the position shown in FIG. 9(b) to the position shown in FIG. 9(c), the movement delay mechanism 77A in this embodiment has a first stroke region 78A extending over a distance that the abutment/linkage portion 75A of the operation member 70A moves until abutting against the engagement portion 92A of the second stopper 91A. A second stroke region 79A of the movement delay mechanism 77A is a region where the abutment/linkage portion 75A of the operation member 70A abuts against the engagement portion 92A of the second stopper 91A to disengage the second stopper 91A from the disengagement portion 85A of the displacement member 80A when the operation member 70A moves from the position shown in FIG. 9(c) to the position shown in FIG. 9(a).

Description will be given about operation of the operating mechanism 7A and second stopper 91A according to the embodiment.

As shown in FIG. 9(a), when the operation member 70A is pressed from above, the operation member 70A slides down in the opening 86A along the inclined portion 84A since the movement transmission portion 74A of the operation member 70A is in contact with the inclined portion 84A of the displacement member 80A. At the same time, the displacement member 80A moves leftward such that the second stopper 91A is engaged with the disengagement portion 85A of the displacement member 80A. The leftward movement of the displacement member 80A pulls the wire 60 so as to displace the brake member 5 to the brake release position. It is therefore possible in this manner to maintain the operating mechanism 7A in the second position, and to maintain the brake member 5 in the brake release position.

If, for example, a weakened force pressing the lever handle 87 brings the operation member 70A from the state shown in FIG. 9(b) to the state shown in FIG. 9(c), the operation member 70A moves upwardly, thereby moving the abutment/linkage portion 75A upwardly from below in the first stroke region 78A. During this movement, the second stopper 91A remains engaged with the disengagement portion 85A of the displacement member 80A, and therefore the engagement position between the second stopper 91A and displacement member 80A remains maintained.

In addition, if the operation member 70A is brought from the state shown in FIG. 9(c) to the state shown in FIG. 9(a) upon release of the lever handle 87, the further upward movement of the operation member 70A moves the abutment/linkage portion 75A further upwardly in the second stroke region 79A. This movement allows the abutment/linkage portion 75A of the operation member 70A to abut against the engagement portion 92A of the second stopper 91A and then to pull the second stopper 91A off the disengagement portion 85A.

Referring to FIG. 10, the first stopper 90 is locked by the lock portion 72A formed in the operation member 70A. As in the case of the first embodiment, a switch 95 is provided on a front cover 36, and the first stopper 90 can be locked in the lock portion 72A formed in the operation member 70A by manipulating the switch 95.

In the above-describe embodiments, the maintaining mechanism includes the first stopper 90 and second stopper 91 or 91A; however, this invention can be implemented with at least one of the first stopper 90 and the second stoppers 91, 91A.

Although the brake member 5 is provided on the rear wheel in the above-described embodiments; however, the brake member 5 can be also provided on the front wheels. In addition, the stroller 1 is not limited to strollers configured to brake both left and right wheels simultaneously.

It should be understood that the embodiments disclosed herein are illustrative and non-restrictive in every respect. The scope of the present invention is defined by the terms of the claims, rather than by the foregoing description, and is intended to include any modifications within the scope and meaning equivalent to the terms of the claims.

What is claimed is:

1. A stroller comprising:
a body frame including a leg section and a push rod;
wheels each provided at a lower end of the leg section;
a brake member located at a lower end of the leg section, and displaced between a braking position in which the brake member is engaged with the wheel to stop the wheel from rotating and a brake release position in which the brake member is disengaged from the wheel to permit the wheel to rotate;
an operation member operatively associated with the brake member through a coupling member, and being capable of being displaced between a first position corresponding to the braking position of the brake member; a second position corresponding to the brake release position of the brake member, and an intermediate position between the first position and the second position;
a bias member biasing the brake member to move the brake member to the braking position;
a displacement member that is displaced by the operation member from a second displacement position to a first displacement position in conjunction with a movement of the operation member from the first position to the second position; and
a movement delay mechanism configured to delay transmission of movement of the operation member to the displacement member,
wherein upon movement of the operation member from the second position to the intermediate position, the movement delay mechanism maintains the displacement member at the first displacement position and the brake member in the brake release position, and
wherein upon movement of the operation member from the intermediate position to the first position, the displacement member moves from the first displacement position to the second displacement position to move the brake member from the brake release position to the braking position.

2. The stroller according to claim 1, wherein the displacement member is coupled to the coupling member, and is biased to move toward the second displacement position.

3. The stroller according to claim 2, further comprising a maintaining mechanism, wherein the maintaining mechanism includes a first stopper capable of moving between an engagement position in which the first stopper is engaged with the operation member to maintain the operation member in the second position and a disengagement position in which the first stopper is disengaged from the operation member.

4. The stroller according to claim 2, further comprising a maintaining mechanism, wherein the maintaining mechanism includes a second stopper capable of moving between an engagement position in which the second stopper is engaged with the displacement member to maintain the displacement member in the first displacement position and a disengagement position in which the second stopper is disengaged from the displacement member.

5. The stroller according to claim 4, wherein
the second stopper includes a bias member biasing the second stopper to abut the second stopper against the displacement member, and
the displacement member includes a disengagement portion that receives the second stopper at the first displacement position.

6. The stroller according to claim 5, wherein the operation member includes an abutment/linkage portion that abuts on the second stopper to disengage the second stopper from the disengagement portion when the operation member moves from the second position to the first position.

7. The stroller according to claim 6, wherein the second stopper moves a distance to abut on the abutment/linkage portion on its way from the second position to the first position.

8. The stroller according to claim 4, wherein the movement delay mechanism maintains the engagement position in which the second stopper is engaged with the displacement member in a first stroke region of the movement delay mechanism, in which the operation member moves from the second position to the intermediate position, and brings the second stopper into the disengagement position, in which the second stopper is disengaged from the displacement member, in a second stroke region of the movement delay mechanism, in which the operation member moves from the intermediate position to the first position.

9. The stroller according to claim 2, further comprising a lever handle that extends in a width direction along the push rod, and is attached to the push rod at opposite ends, wherein the operation member is displaced in conjunction with operation of the lever handle.

* * * * *